United States Patent
Helland et al.

(10) Patent No.: US 11,625,386 B2
(45) Date of Patent: Apr. 11, 2023

(54) FAST SKIP LIST PURGE

(71) Applicant: salesforce.com, inc., San Francisco, CA (US)

(72) Inventors: Patrick James Helland, San Rafael, CA (US); James E. Mace, San Francisco, CA (US); Akshay Manchale Sridhar, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 152 days.

(21) Appl. No.: 17/162,794

(22) Filed: Jan. 29, 2021

(65) Prior Publication Data

US 2022/0245123 A1 Aug. 4, 2022

(51) Int. Cl.
*G06F 16/23* (2019.01)
*G06F 16/22* (2019.01)

(52) U.S. Cl.
CPC ...... *G06F 16/2365* (2019.01); *G06F 16/2255* (2019.01)

(58) Field of Classification Search
CPC .......................... G06F 16/2365; G06F 16/2255
USPC ......................................................... 707/692
See application file for complete search history.

(56) References Cited

U.S. PATENT DOCUMENTS

| | | | |
|---|---|---|---|
| 5,659,739 A | 8/1997 | Lubbers et al. | |
| 7,424,477 B1* | 9/2008 | Martin | G06F 9/524 707/999.102 |
| 10,158,642 B2 | 12/2018 | Jujjuri et al. | |
| 10,241,896 B2 | 3/2019 | Martin et al. | |
| 10,346,386 B2 | 7/2019 | Chatterjee et al. | |
| 10,592,353 B2 | 3/2020 | Martin et al. | |
| 10,599,485 B2* | 3/2020 | Levandoski | G06F 9/52 |
| 10,621,071 B2 | 4/2020 | Martin et al. | |
| 10,691,696 B2 | 6/2020 | Helland et al. | |
| 10,769,128 B2 | 9/2020 | Mace et al. | |
| 2009/0132563 A1* | 5/2009 | Herlihy | G06F 16/2315 |
| 2011/0246503 A1* | 10/2011 | Bender | G06F 9/546 707/769 |

(Continued)

FOREIGN PATENT DOCUMENTS

WO 2018/046084 A1 3/2018

OTHER PUBLICATIONS

International Search Report and Written Opinion in PCT Appl. No. PCT/US2021/062155 dated Mar. 23, 2022, 15 pages.

*Primary Examiner* — James Trujillo
*Assistant Examiner* — Fariborz Khoshnoodi
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to efficiently managing skip list data structures. In some embodiments, a computing system stores a skip list including a plurality of key-value records that include one or more pointers to others of the plurality of key-value records. The computing system scans the plurality of key-value records in key order to identify key-value records to be purged from the skip list. The scanning includes maintaining a list of key-value records that include pointers that point to key-value records that have not yet been scanned by the scanning. In response to identifying a key-value record for purging, the computing system purges the key-value record by substituting the pointers included the key-value records of the list with pointers included in the key-value record being purged.

20 Claims, 14 Drawing Sheets

(56) References Cited

U.S. PATENT DOCUMENTS

| | | | |
|---|---|---|---|
| 2013/0238428 A1 | 9/2013 | Palakurthy | |
| 2014/0172898 A1* | 6/2014 | Aguilera | G06F 16/24542 |
| | | | 707/759 |
| 2016/0117318 A1 | 4/2016 | Helland | |
| 2016/0179865 A1* | 6/2016 | Bortnikov | G06F 9/52 |
| | | | 707/704 |
| 2018/0157696 A1* | 6/2018 | McKenney | G06F 16/2343 |
| 2018/0218023 A1* | 8/2018 | Fanghaenel | G06F 16/2343 |
| 2018/0307620 A1* | 10/2018 | Zhou | G06F 12/0246 |
| 2019/0163613 A1 | 5/2019 | Martin et al. | |
| 2019/0205344 A1* | 7/2019 | Gold | G06F 16/90348 |
| 2019/0278762 A1 | 9/2019 | Chatterjee et al. | |
| 2020/0089789 A1 | 3/2020 | Mace et al. | |
| 2020/0097464 A1 | 3/2020 | Subramaniam et al. | |
| 2020/0159628 A1 | 5/2020 | Martin et al. | |
| 2020/0201745 A1 | 6/2020 | Martin et al. | |
| 2020/0320083 A1 | 10/2020 | Helland et al. | |
| 2020/0341815 A1 | 10/2020 | Manchale Sridhar et al. | |

* cited by examiner

FAST SKIP LIST PURGE

BACKGROUND

Technical Field

This disclosure relates generally to data storage, and, more specifically, to manipulating a skip list data structure.

Description of the Related Art

In the computer science field, various complex data structures have been developed to facilitate the storage of information. These data structures are often composed using multiple pointers to join a collection of records together. When designing a complex structure, a developer is often weighing concerns related to the complexities of inserting and retrieving information as well as the overall data structure size. A skip list is one example of a more complex data structure, which can be popular as it can maintain large data sets while still offering O(log n) insertion complexity and O(log n) search complexity. In this type of data structure, records are sorted based on key order and associated using a linked hierarchy of data record sequences, with each successive sequence skipping over fewer elements than the previous sequence. This linked hierarchy is implemented using varying heights of pointer towers such that, within a given a tower, pointers may be arranged based on the numbers of skipped-over records. This ability to skip over records when the skip list is traversed may allow a given record to be located more quickly than scanning through the records sequentially.

DETAILED DESCRIPTION

Figure 1:
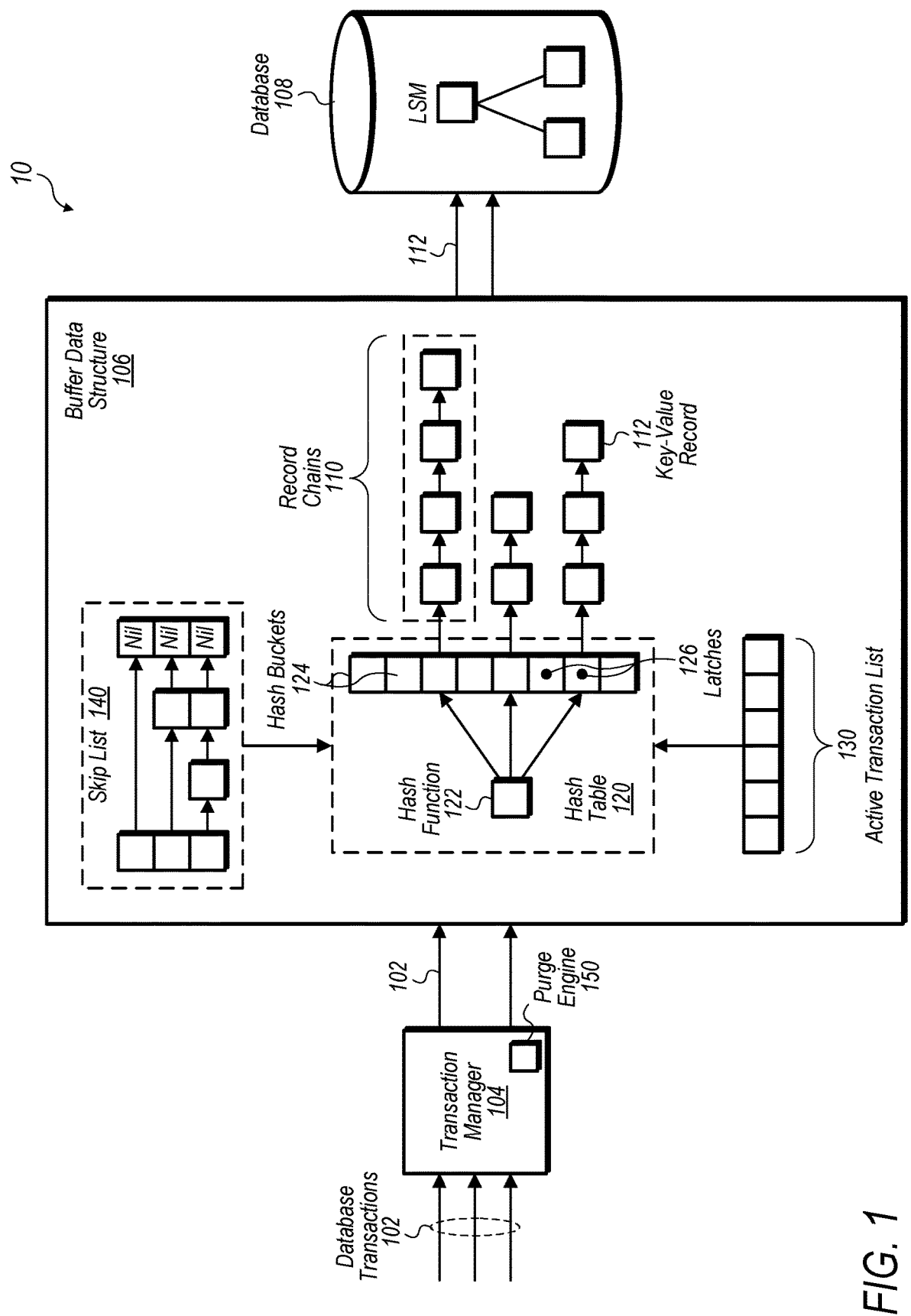
FIG. 1 is a block diagram illustrating one embodiment of a database system that uses a skip list within a buffer data structure to process concurrent database transactions.

In some instances, skip lists may be used to maintain large quantities of information that is frequently manipulated. For example, as will be described below in further detail, a database system may use a buffer data structure to store data of active database transactions until the database transactions can be committed and their data flushed to a persistent storage of the database system. The buffer data structure may include a skip list data structure that enables efficient storage and lookup of transaction records in key order. As this database system may process a high volume of transactions in parallel, efficient maintenance of the skip list can be important for database performance.

The present disclosure describes embodiments in which a fast purge algorithm is employed to efficiently purge records from a skip list when they are no longer in use. As will be described below in various embodiments, key-value records of a skip list are scanned in key order by walking a lowest level of the skip list to identify key-value records for purging. (As used herein, a "key-value record" refers to a record identified by a key and including a corresponding value—the key and value collectively being referred to as a "key-value pair.") As the records are scanned, the records are examined to determine whether they are ready to be purged by, in some embodiments, examining a flag set to indicate when purging is permissible. Pointer information is recorded for the pointers included in the pointer towers and maintained until those pointers become resolved (i.e., the records pointed to by those pointers become scanned). If a record is identified for purging, the key-value record is purged by substituting one or more of the currently unresolved pointers with pointers included in the key-value record being purged. As will be discussed, this approach of scanning the skip list in key order and tracking unresolved pointers can result in significantly fewer memory accesses than other approaches such as those that rely on traversing down a skip list to determine what pointers should be updated when a record being purged.

Moreover, a fast parallel purge algorithm is also discussed in which a skip list is divided into sections that are scanned in parallel by multiple threads. (As used herein, the phrase "in parallel" refers to two or more operations (or two or more instances of the same operation) that are performed such that they overlap for, at least, a portion of time.) As will be discussed in various embodiments, skip-list sections may be determined by traversing a top portion of the skip list to identify key-value records, which can form the boundaries of these sections. These sections may then be assigned to separate threads that can scan their assigned sections in parallel using the fast purge algorithm. After the sections are scanned by the threads, records at section boundaries that are identified for purging may be purged by traversing down the skip list to identify what skip list pointers should be updated.

Figure 2:
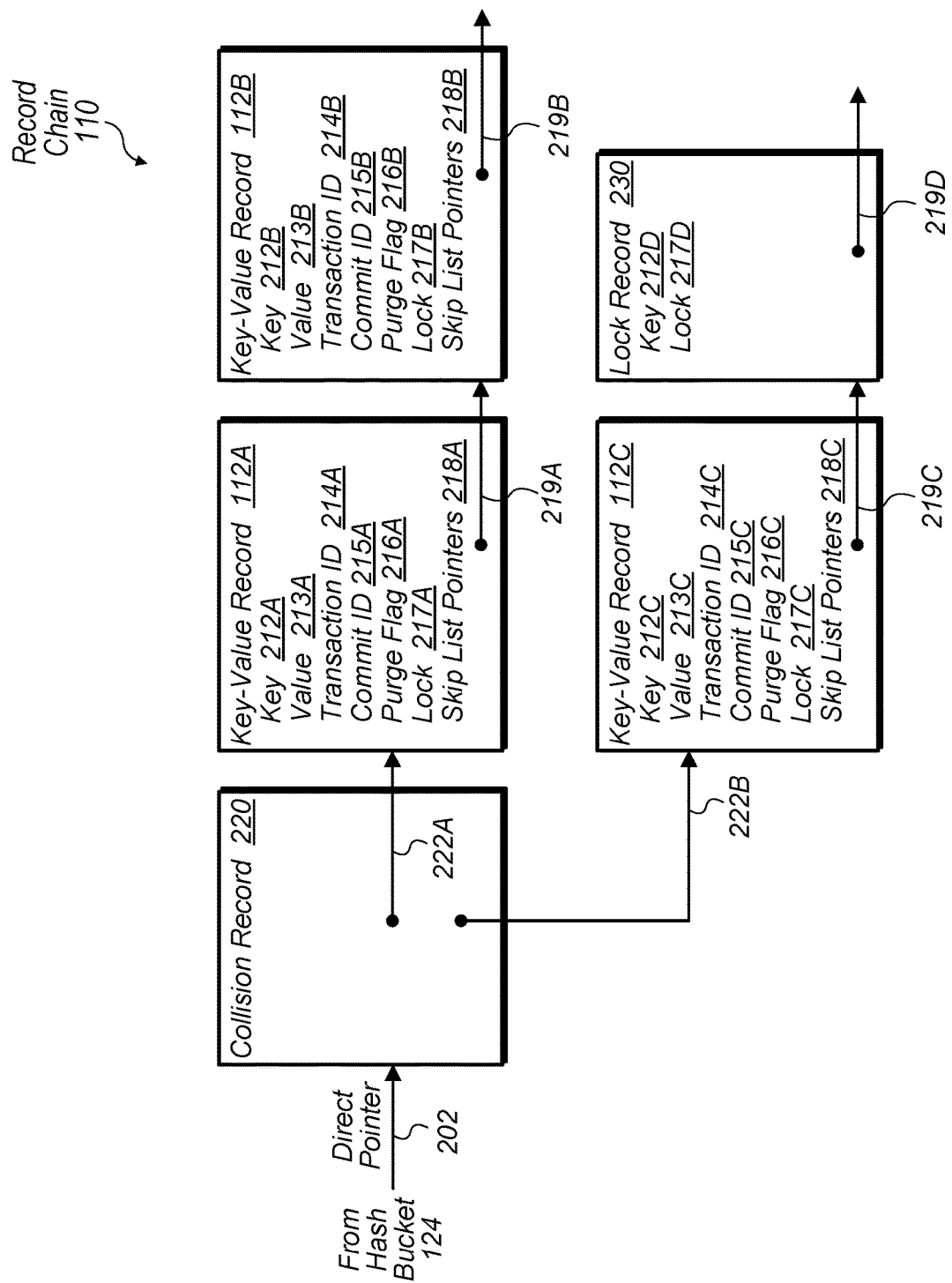
FIG. 2 is a block diagram illustrating one embodiment of a record chain within the buffer data structure.

The present disclosure begins with a discussion of a database system in conjunction with FIGS. 1 and 2, which may maintain a skip list and use the fast purge algorithm. An exemplary skip list is discussed in conjunction with FIG. 3. A less efficient algorithm for purging records is then discussed with respect to FIG. 4. The fast purge algorithm is discussed with respect to FIGS. 5A-6. The parallel fast purge algorithm using multiple threads is discussed with FIG. 7. Lastly, methods and an exemplary computing system are discussed with respect to FIGS. 8A-9.

Turning now to FIG. 1, a block diagram of a database system 10 is depicted. In illustrated embodiment, database system 10 includes a transaction manager 104, buffer data structure 106, and a database 108. As shown, buffer data structure 106 includes multiple record chains 110, hash table 120, active transaction list 130, and skip list 140. Record chains 110 include key-value records 112. Hash table 120 includes a hash function 122 and an array of a hash buckets 124, each including a latch 126. (As used herein, the term "latch," "lock," and "semaphore" are used generally to refer to a variable that controls access to a resource shared among multiple potential consumers.) In the illustrated embodiment, manager 104 also includes a purge engine 150. In some embodiments, database system 10 may be implemented differently than shown. For example, in some embodiments, buffer data structure 106 may include more (or less) structures.

Transaction manager 104, in one embodiment, includes program instructions that are executable to process received database transactions 102. In general, transactions 102 may be issued to read or write data to database 108 and may be received from any of various sources such as one or more client devices, application servers, software executing on database system 10, etc. As will be described in greater detail below, this processing may entail manager 104 initially storing records 112 for key-value pairs of transactions 102 in buffer data structure 106 until the records 112 can be flushed to the persistent storage of database 108. Accordingly, various functionality described below with respect to buffer data structure 106 may be implemented by transaction manager 104 such as adding key-value records 112 to record chains 110, facilitating acquisition of hash-bucket latches 126 for transactions 102, modifications to active transaction list 130 and skip list 140, etc.

Buffer data structure 106, in one embodiment, is a data structure that buffers key-value pairs for active transactions until the transactions commit. As will be described below, buffer data structure 106 is structured in a manner that allows for quick insertion of key-value pairs, which can be performed concurrently in some instances allowing for high volumes of transactions to be processed efficiently. Still further, buffer data structure 106 may reside in a local memory allowing for faster reads and writes than the persistent storage of database 108 where the data resides long term. In various embodiments, buffer data structure 106 allows concurrent modifications to be performed to it for different transactions 102, but provides a concurrency control mechanism via hash-bucket latches 126 for data within buffer data structure 106. In some embodiments, committed transaction data is asynchronously flushed from buffer data structure 106 to the persistent storage of database 108. That is, rather than perform a flush for each transaction 102's data upon its commitment, a flush is performed periodically for multiple committed transactions 102. For example, in one embodiment, transaction manager 104 initiates a flush to database 108 in response to buffer data structure 106 satisfying a particular size threshold.

Database 108 may correspond to any suitable form of database implementation. In some embodiments, database 108 is a relational database that is implemented using a log-structured merge (LSM) tree for persistent storage. In some embodiments, layers of the LSM tree may be distributed across multiple physical computer systems providing persistent storage. In some embodiments, these computers systems are cluster nodes of a computer cluster that provides a cloud-based system accessible to multiple clients. In some embodiments, database 108 may be part of a software as a service (SaaS) model; in other embodiments, database 108 may be directly operated by a user.

As noted above, when transaction manager 104 stores a key-value pair for an active transaction 102 in buffer data structure 106, a corresponding key-value record 112 may be created that includes the value and the key. If multiple transactions 102 attempt to write values associated with the same key, key-value records 112 may be generated for each value and linked to together to form a record chain 110 corresponding to the key. For example, if a user has withdrawn a first amount from a bank account resulting in a first database transaction 102 and then a second amount resulting in a second database transaction 102, a record chain 110 corresponding to an account-balance key may have two key-value records 112 reflecting those withdrawals. In various embodiments, each record 112 includes a transaction identifier (e.g., a transaction sequence number) specifying its associated transaction 102; records 112 may also be organized in a record chain 110 based on the ordering in which the transactions 102 are received. For example, as described below with respect to FIG. 2, record chains 110 may be implemented using linked lists such that a new record 112 is inserted at the head of the linked list and migrates to the tail as newer records 112 are created and older ones are flushed to database 108. To facilitate quick access to key-value records 112, record chains 110 are appended to hash buckets 124 of hash table 120.

Hash table 120, in one embodiment, is a data structure that allows constant-time lookups of record chains 110 based on given a key. That is, when a key is received, hash table 120 is indexed into by applying hash function 122 to the key to produce the appropriate index value for the hash bucket 124 corresponding to the key. The direct pointer in the hash bucket 124 may then be referenced to obtain to the record chain 110. Being able to perform constant-time lookups may significantly reduce the time consumed to read key-value records 112, write records 112, or perform key probes (i.e., determining whether a key has a key-value record 112 present in buffer data structure 106).

As noted above, in various embodiments, each hash bucket 124 includes a respective latch 126 that controls access to its record chain 110. Accordingly, when a transaction is attempting to read or write a value associated with a particular key, the key may be used to index into hash table 120 and acquire the latch 126 corresponding to the key's associated hash bucket 124 before reading or writing is performed. If a latch 126 cannot be acquired for a database transaction 102, processing the database transaction 102 may be delayed until the latch 126 is released. In some embodiments, latches 126 may have one of three possible states: available, shared acquired, and exclusively acquired. If no transaction 102 is currently accessing a record chain 110, its latch 126 is available for acquiring. If a transaction 102 is performing a read of a key-value record 112, the latch 126 may be acquired in a shared state—meaning that other transactions 102 can also acquire the latch 126 as long as they are also performing a read (i.e., not attempting to modify a record 112 while it is also being read). If a transaction 102 is performing a write, however, the latch 126 is acquired for the transaction 102 in an exclusive state— meaning no other transaction 102 may acquire the latch 126 until it is released. Accordingly, if two transactions 102 are attempting to perform writes for the same key, the later transaction is delayed until the former completes its write operation and releases the latch 126. If a transaction 102 is attempting to access multiple key-value pairs, latches 126 may be acquired in ascending order of buckets 124 to prevent deadlock. Although acquisition of latches 126 may be discussed primarily with respect to read and write operations, latches 126 may also be acquired when performing other operations such as defragmentation, garbage collection, flushing records 112 to the persistent store of database 108, etc. In some embodiments, latches 126 may also serve as a concurrency control mechanism for active transaction list 130 and skip list 140.

Active transaction list 130, in one embodiment, is a data structure that tracks various metadata for active transactions 102. In various embodiments, the metadata for a given transaction 102 includes a transaction identifier for the transaction 102 and one or more pointers usable to access records 112 associated with the transaction 102. In doing so, list 130 enables a transaction 102's records 112 to be identified based on its transaction identifier, which may be helpful when, for example, determining which records 112 should be removed if the transaction 102 is being rolled back. The metadata may also include an indication of whether a transaction is active or committed, which may be used to determine if its records 112 can be marked for flushing to database 108.

Skip list 140, in one embodiment, is a data structure that maintains an ordering of keys in records 112 to allow forward and reverse scanning of keys. In some embodiments, database 108 may be configured such that records 112 for committed transactions 102 are flushed in ascending key order (as well as version order); skip list 140 may allow this ordering to be quickly and easily determined. As will be described in greater detail below with respect to FIG. 3, in some embodiments, skip list 140 includes indirect pointers for accessing records 112 of skip list 140. That is, rather than have direct pointers between records 112 (i.e., pointers specifying the memory addresses of records 112), skip list 140 includes indirect pointers to the hash buckets 124, which include the direct pointers to chains 110. Advantageously, if a new record 112 gets added to a record chain 110, the direct pointer in the hash bucket 124 is updated, not the indirect pointer in skip list 140. Use of indirect pointers may also enable skip list 140 to leverage hash-bucket latches 126 when manipulating records 112 with respect to list 140. Accordingly, if a record 112 for a transaction 102 is being accessed through skip list 140 for modification or removal, a latch 126 may be acquired for the record 112's key to prevent other modifications from being performed. Although shown separately from records 112 in FIG. 1, portions of skip list 140, in some embodiments, may reside in records 112 as will be discussed with respect to FIGS. 2 and 3.

As records 112 for committed transactions 102 are flushed, the contents of records 112 may continue to remain in buffer data structure 106 until it can be confirmed that they have successfully been written to the persistent storage of database 108. Records 112 may then be flagged for purging as their contents may no longer be needed and to free up additional space in buffer data structure 106 for newly incoming database transactions 102. To facilitate this purging, pointers used to implement record chains 110, active transaction list 130, and skip list 140 may need to be updated.

Purge engine 150, in one embodiment, is a component of transaction manager 104 that handles the purging of records 112 including the updating of these pointers. As will be described in greater detail below in various embodiments, purge engine 150 implements a fast purge algorithm for identifying and purging records 112 from skip list 140. As noted above, this may include purge engine 150 scanning through skip list 140 in key order to determine whether ones of key-value records 112 have been flagged for purging. As part of this scanning, purge engine 150 may maintain a list of unresolved skip-list pointers and, in response to identifying a key-value record 112 to be purged, substitute the unresolved pointers in other records 112 with skip-list pointers included in the key-value record 112 being purged. In various embodiments, the purging algorithm is also implemented in a manner allows transaction manager 104 to continue to insert records 112 into skip list 140 (and, more generally, buffer data structure 106) while the scanning is ongoing in order to reduce the impact of purge engine 150 on database system 10. As will be discussed, in order to ensure that the inserting of records 112 does not interfere problematically with the purging of records 112, purge engine 150 may also manage acquisition of latches 126, pinning records 112, and verifying unresolved pointer information prior to performing any pointer substitutions. In some embodiments, purge engine 150 may also manage a thread pool of executing threads in order to implement the parallel fast purge algorithm noted above and discussed in greater detail below.

The contents of records 112, including those used to implement skip list 140, will now be discussed in greater detail in order to facilitate better understanding of the fast purge algorithms discussed in detail later.

Turning now to FIG. 2, a block diagram of a record chain 110 is depicted. As shown, record chain 110 may include a collection of key-value records 112A-112C, a collision record 220, and a lock record 230. Records 112 may further include a key 212, value 213, transaction identifier 214, commit identifier 215, purge flag 216, lock 217, skip list pointers 218, and record-chain pointer 219. In some embodiments, chain 110 may include more (or fewer) records 112, 220, or 230 than shown; a given record 112 may also include more (or fewer) elements 212-219 than shown.

In the illustrated embodiment, record chain 110 is implemented using a linked list such that each key-value record 112 includes a pointer 219 identifying the next record 112 in the chain 110. When a record 112 is added, it is inserted at the head identified by the direct pointer 202 in the hash bucket 124 or appended to a collision record 220 discussed below. The added record 112 may then include a pointer 219 to the record that was previously at the head. As the record 112 becomes older, it migrates toward the tail (record 112B or lock record 230 in FIG. 2) until its transaction 102 commits. Then, it may be flushed to database 108's persistent storage and removed. A given record 112's transaction identifier 214 may identify, not only the transaction 102 to which the record 112 is associated, but also indicate the ordering in which transactions 102 were received. Accordingly, since record 112B is further from the head than record 112A, transaction ID 214B may correspond to an earlier transaction 102 than transaction ID 214A. If the transaction 102 corresponding to transaction ID 214B is to be rolled back, transaction manager 104 may locate record 112B by referencing direct pointer 202 to identify the head of chain 110 and traverse through records 112A and 220 until finding the record 112B having the corresponding transaction ID 214B. Record 112B may then be removed and pointer 222A modified to have the same address as pointer 219B. In some embodiments, if a transaction 102 commits, the commit identifiers 215 for its records 112 may be set to reflect the commitment and mark the record 112 as being ready for flushing to database 108's persistent storage. Records 112 may later be scanned by a process of transaction manager 104 to identify which records 112 have commit identifiers 215 and to determine which records 112 can be flushed to database 108.

Once a key-value record 112 has been successfully flushed to persistent storage, in some embodiments, transaction manager 104 sets a purge flag 216 to indicate that the record 112 is ready for purging from buffer data structure 106. As noted above, purge engine 150 may read this flag 216 in order determine whether the record 112 should be purged from buffer data structure 106.

In some embodiments, collision records 220 are used to append records 112 to chain 110 when two different keys (e.g., keys 212A and 213C) produce the same hash value (i.e., a hash collision occurs) and thus share the same hash bucket 124. In various embodiments, the size of hash table 120 is selected to have a sufficient number of hash buckets 124 in order to ensure a low likelihood of collision. If a hash collision occurs, however, a record 220 may be inserted including pointers 222 to records 112 having different keys 212. Although, in many instances, a hash-bucket latch 126 is specific to a single respective key 212, in such an event, the hash-bucket latch 126 would be associated with multiple, different keys 212.

As noted above, in some embodiments, individual records 112 may also include their own respective locks 217 to provide additional coherency control. In some embodiments, a separate lock record 230 may also be inserted into record chains 110 to create a lock tied to a particular key when there is no corresponding value.

Skip list pointers 218, in one embodiment, are the pointers that form skip list 140. As will be discussed next with FIG. 3, pointers 218 within a given record 112 may form a pointer tower that implements a linked hierarchy of data records sequences, with each successive sequence skipping over fewer records 112 than the previous sequence. In some embodiments, pointers 218 are also implemented using indirect pointers through which key-value records 112 are linked together in skip list 140 without using direct pointers to the physical addresses of records 112. Instead, pointers 218 reference the hash buckets 124 that point to the record chains 110 including records 112. In various embodiments, using indirect pointers greatly simplifies pointer management because only one direct pointer may be maintained for a given record 112. That is, since the location of the hash bucket 124 remains in the same, the indirect pointer is not updated if a record 112 is moved, for example, to a later position in a record chain 110.

Figure 3:
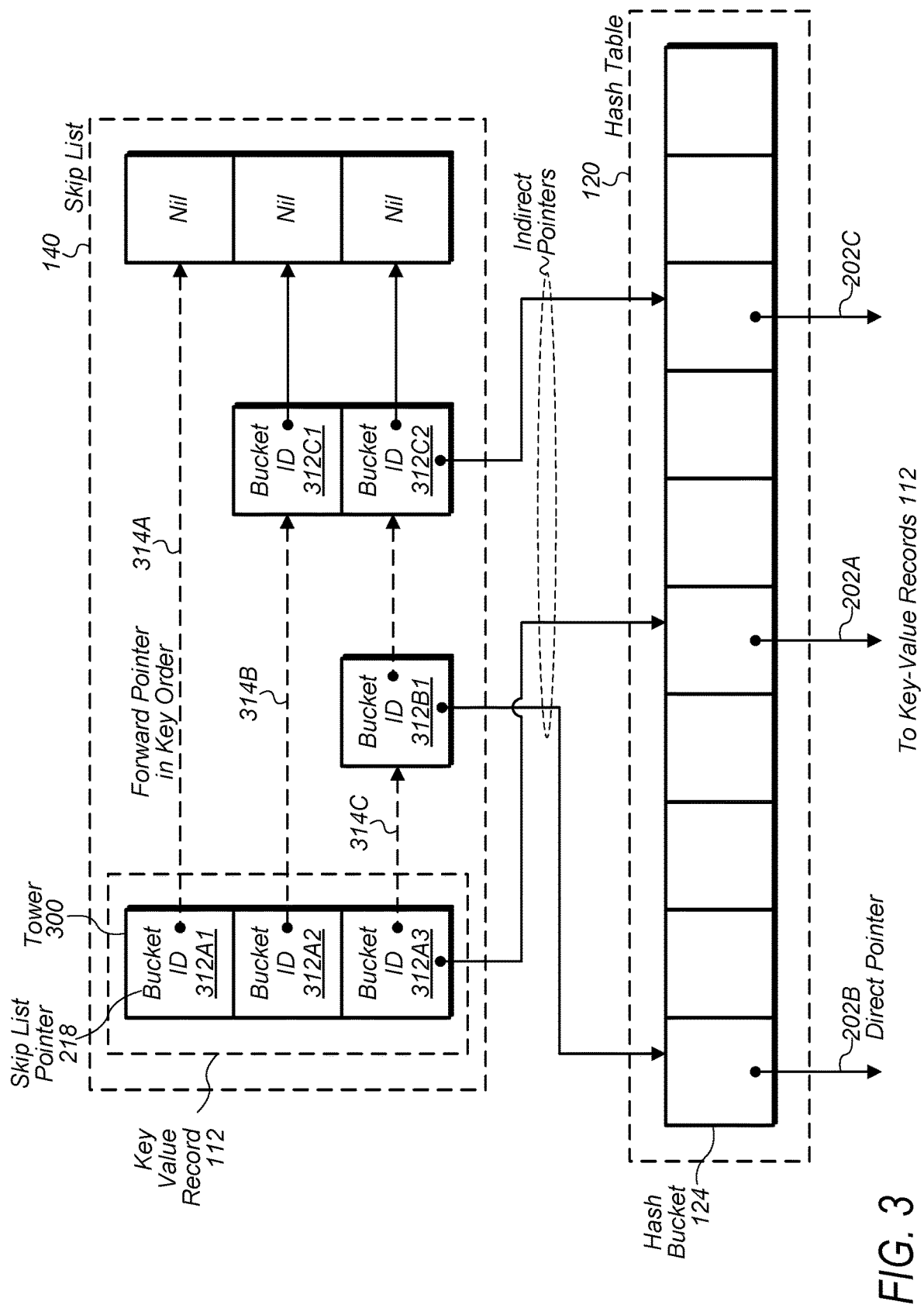
FIG. 3 is a block diagram illustrating one embodiment of a skip list within the buffer data structure.

Turning now to FIG. 3, a block diagram of skip list 140 is depicted. As noted above, in various embodiments, skip list 140 may be used to maintain an ordering of keys 212 stored in records 112, which may be used to flush records 112 of committed transactions 102 in ascending key order. In the illustrated embodiment, skip list pointers 218 within a record 112 form a tower 300 that point to towers 300 in other records 112.

When a particular key 212 is being searched in skip list 140, traversal of skip list 140 may begin, in the illustrated embodiment, at the top of the left most tower 300 (the location corresponding to bucket ID 312A1 in the illustrated embodiment), where the key 212 in record 112 is compared against the key being searched. If there is a match, the record 112 being searched for has been located. If not, traversal proceeds along the path of forward pointer 314A to another record 112 having another key 212, which is compared. If that key 212 is less than key 212 being searched for, traversal returns to the previous tower 300 and drops down to the next level in the tower 300 (the location of bucket ID 312A2 in FIG. 3). If, however, the key 212 being search for is greater than the other key 212, traversal proceeds forward along another pointer 314. This process then continues onward until a match is identified for the record 112 being searched for. An example of this traversal will be discussed below with FIG. 4.

Although forward pointers 314 are depicted in FIG. 3 (and subsequent figures) to facilitate understanding, skip list pointers 218, in some embodiments, are implemented using indirect pointers. In the illustrated embodiment, skip list pointers 218 are specifically implemented using bucket identifiers 312 that point to buckets 124 in hash table 120, which in turn point to records 112 via pointers 202. Thus, proceeding along pointer 314C includes following the pointer 218 of bucket ID 312A3 to a bucket 124 and proceeding along pointer 202A to the record chain 110 including the record 112 with the pointer 218 of bucket 312B1. Although not depicted, in some embodiments, skip list 140 also includes a set of backward pointers, which may be implemented in a similar manner and will be discussed in greater detail below.

When a record 112 is eventually purged, the skip pointers 218 residing in other records 112 that point to the purged record 112 are identified so that they can be updated to no longer point to a purged record 112. Once they have been identified, they are updated using the skip list pointers 218 in the record 112 being purged. Before discussing the fast purge algorithms, it is instructive to consider how a less efficient purge algorithm identifies relevant skip list pointers 218 to be updated.

Figure 4:
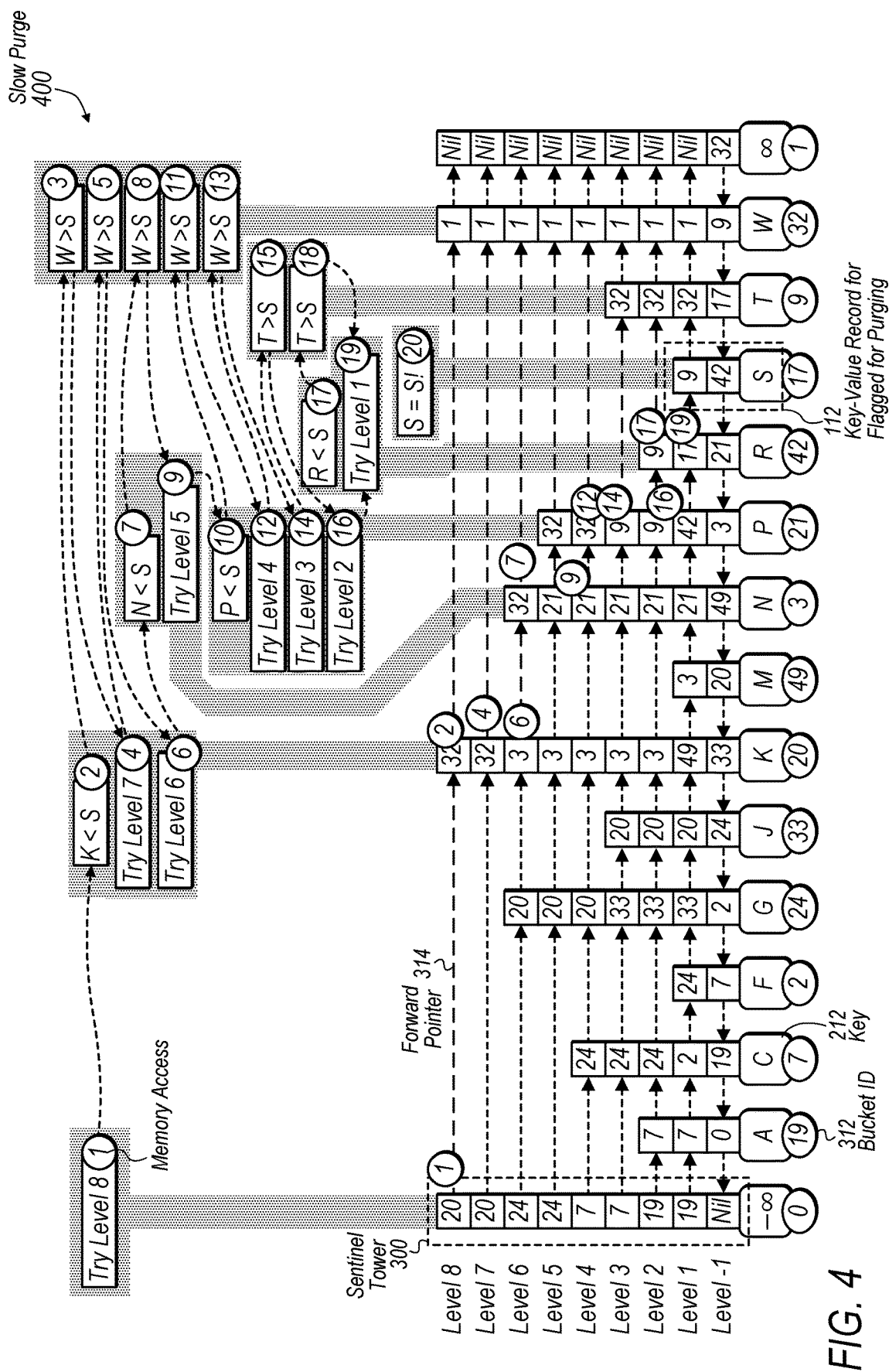
FIG. 4 is a block diagram illustrating one embodiment of a slow purge process for purging records from the skip list.

Turning now to FIG. 4, a block diagram of a slow purge 400 is depicted. As will be discussed, slow purge 400 is a less efficient algorithm than the fast purge algorithms discussed later as it uses a far greater number of memory accesses to identify relevant records 112 for updating. As shown in FIG. 4, an example skip list 140 may be constructed from records 112 sorted in ordering of keys 212 A-W. The skip list 140 includes eight levels (shown as levels 1-8) of forward pointers 314 allowing for movement in ascending key order and another level (shown as level −1) of backward pointers allowing for movement in descending key order. Sentinel towers 300 are located at either end of the skip list 140 and do not correspond to a record 112 (and thus are shown having keys of −∞ and ∞). Also, beneath each key 212 in FIG. 4 is the bucket identifier 312 for the bucket 124 including a direct pointer 202 to that record 112 (or its record chain 110). Thus, as shown, the bucket 124 having the bucket identifier 312 of 19 includes a pointer 202 to a record 112 with a key 212 of A.

Slow purge 400 may begin with an initial scan (not shown in FIG. 4) in which records 112 are accessed in ascending bucket order to identify records 112 having a set flag 216 indicating that they are ready for purging. In the example depicted in FIG. 4, a record 112 having key 212 of S (or simply "record S") has been identified for purging. The skip list 140 may then be traversed to identify the records 112 that include skip list pointers 218 into record S. As shown, traversal begins at the top of the sentinel tower 300 on the left in which a first memory access is performed to read the skip list pointer 218 at level 8, which includes a bucket ID 312 of 20. A second memory access is then performed to read the record 112 pointed to by bucket #20, which is a record 112 having a key K. Because the key S of the purged record 112 is greater than key K in key order, the traversal continues along level 8 where a record W is read during a third memory access. Because key S is less than key W, the traversal returns to record K in a fourth memory access to read the skip list pointer 218 for the level 7, the next level down. As can be seen, this process continues for another twenty memory accesses until record R is identified as having a pointer 218 of bucket #17 to record S. Once all the records with pointers into record S have been identified (which is records R and T in this example), their pointers can be updated with the pointers in the record 112 being purged. For example, record R's of bucket #17 can be replaced with record S's bucket #9, so that record R can point past record S when it is removed.

As can be seen, the traversal for removing one record includes twenty memory accesses, not including the memory accesses of the initial scan or the multiple accesses to move down a record chain 110. Furthermore, slow purge 400 may performing multiple traversals if multiple records 112 have been identified for purging. Moreover, in some embodiments, skip list 140 may include much taller skip list towers 300 (e.g., ones having 33 levels) and be substantially wider. All these memory accesses can affect system performance. In many instances, the fast purge algorithm discussed next uses far fewer memory accesses.

Figure 5A:
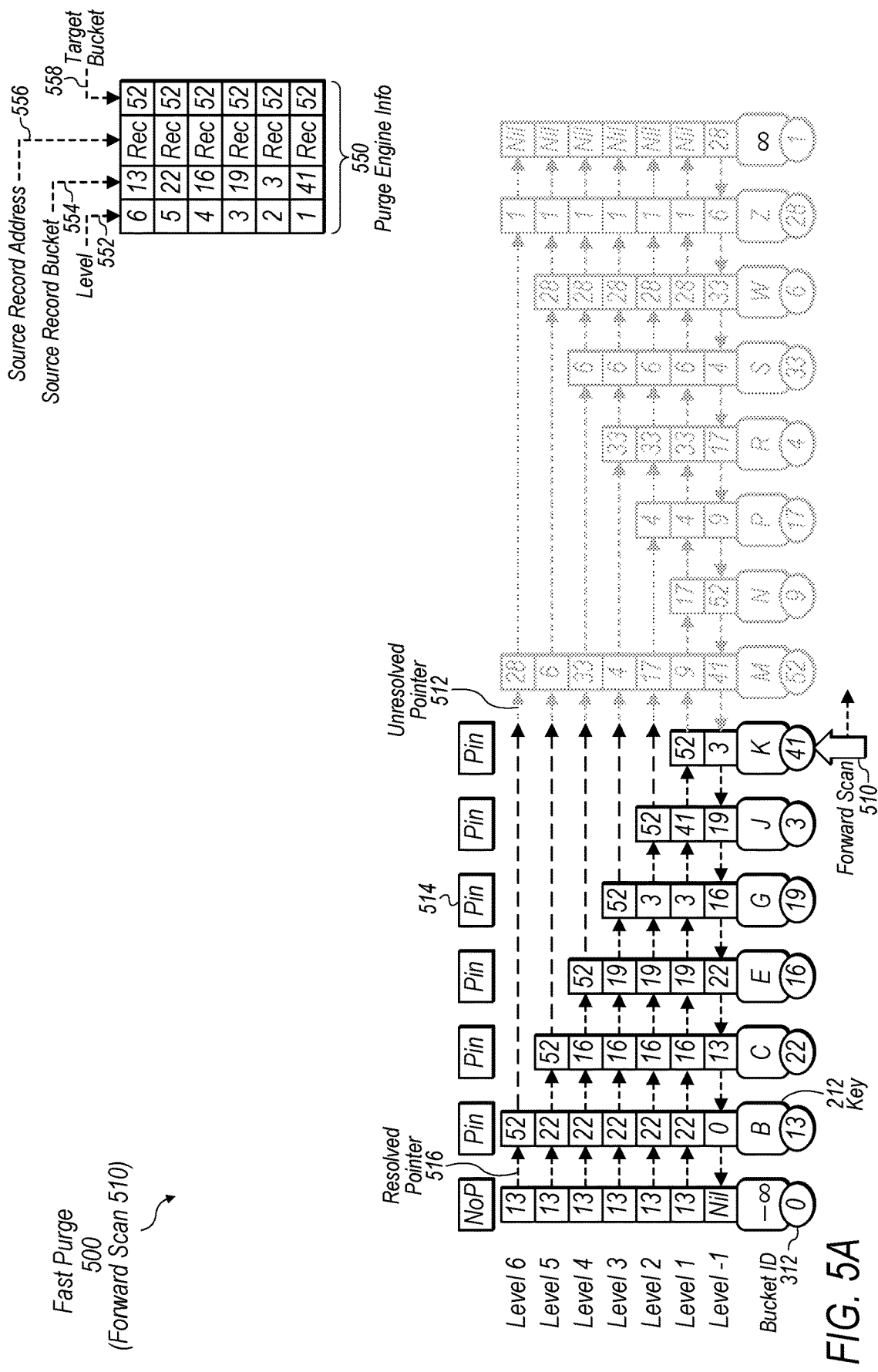
FIGS. 5A-5D are diagrams illustrating embodiments of a fast purge process for purging records from the skip list.

Turning now to FIG. 5A, a block diagram of a fast purge 500 is depicted. As noted above, fast purge 500 may be an algorithm used by purge engine 150 to remove records 112 from skip list 140. In the illustrated embodiment, fast purge 500 begins with a forward scan 510 of skip list 140 in key order. As shown, this scan 510 may start at the sentinel tower 300 shown on the left and uses skip list pointers 218 at level 1 to progress forward efficiently in key order. In this example, scan 510 moves from the sentential tower 300 to bucket #13 pointing to record B. Scan 510 then uses the level 1 skip pointer 218 in record B to move via bucket #22 to record C. This process may continue until scan 510 reaches the other sentinel tower 300 on the far right.

In various embodiments, forward scan 510 serves dual purposes: 1) reading purge flags 216 to identify records 112 to be purged and 2) determining what records 112 warrant updating as they point to records 112 being purged. This approach stands in contrast to slow purge 400 in which these actions are handled by separate operations: the initial scan followed by the downward traversal of skip list 140. When a record 112 is read during scan 510, purge engine 150 may read the purge flag 216 and store information about the skip list pointers 218 included the record 112, which is shown as purge engine information 550. In some embodiments, purge engine 150 also performs a pin 514 of the record 112 (meaning purge engine 150 prevents the record 112 from being relocated in memory). This may be performed, for example, to prevent a garbage collection process from moving the record 112, the record 112 from being purged if it is also flagged, etc.

In the illustrated embodiment, purge engine information 500 is a table that includes a row for each level in the skip list 140. Within each row is a level 552 identifying the skip list level associated with the row, a source record bucket 554 identifying the bucket 124 pointing to record 112, source record address 556 identifying the physical address where that record 112 resides in memory, and a target bucket 124 where a skip list pointer 218 points. When a record 112 is read during scan 510, each row is updated in purge engine information 550 for the height of that record 112's tower 300. Accordingly, in the depicted example, record K has a height of one (in the illustrated embodiment, level −1 is not considered in the height), so its one skip list pointer 218 at level 1 gets recorded in purge engine information 550's level 1 row. Thus, row 1 specifies the bucket ID 312 of 41, includes the record address 556 of the record 112, and the target bucket 558 of 52. The information for this pointer remains in purge engine information 550 until the pointer becomes resolved. As noted above and shown in FIG. 5A, an unresolved pointer 512 is a pointer that points to a record 112 that has not yet been scanned during forward scan 510. Accordingly, pointers 218 to bucket 52 are currently unresolved pointers 512 as record M has not yet been scanned in the example depicted in FIG. 5A. In contrast, a resolved pointer 516 is one that points to an already scanned record 112 such as the sentinel tower's pointer to record B in FIG. 5A. When a pointer 218 becomes resolved, purge engine 150 replaces updates information 550 with the information of a newly scanned record as will be discussed next.

Figure 5B:
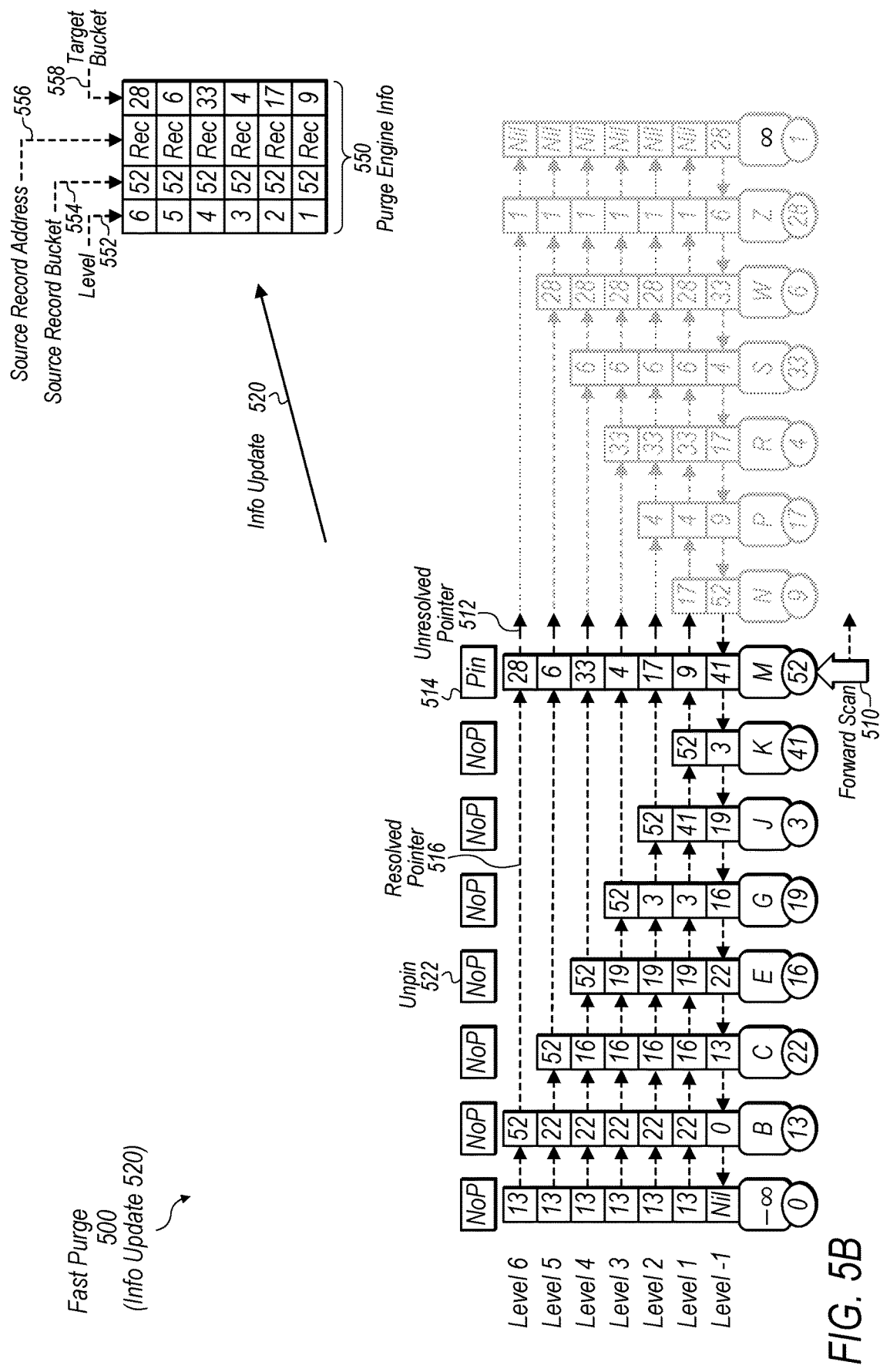

Turning now to FIG. 5B, a block diagram of an information update 520 of purge engine information 550 is depicted. Continuing with the example from FIG. 5A, forward scan 510 has now arrived at bucket #52 and read record M. At this point, the pointers 218 in records B-K have become resolved. If the newly scanned record M is not being purged, purge engine 150 may perform an unpin 522 of records B-K and replace their information in purge engine information 550 with the pointer information record M, which is also pinned. In this example, record M has six levels of pointers 218 in its tower 300, so all six levels of purge engine information 550 are updated. If record M's tower 300 had only three pointers 218, in this example, only three rows would be updated—thus, rows with levels 4-6 would be left as is.

If, on the other hand, the newly scanned record 112 had be flagged for purging, fast purge 500 may proceed as discussed next with FIGS. 5C and 5D.

Figure 5C:
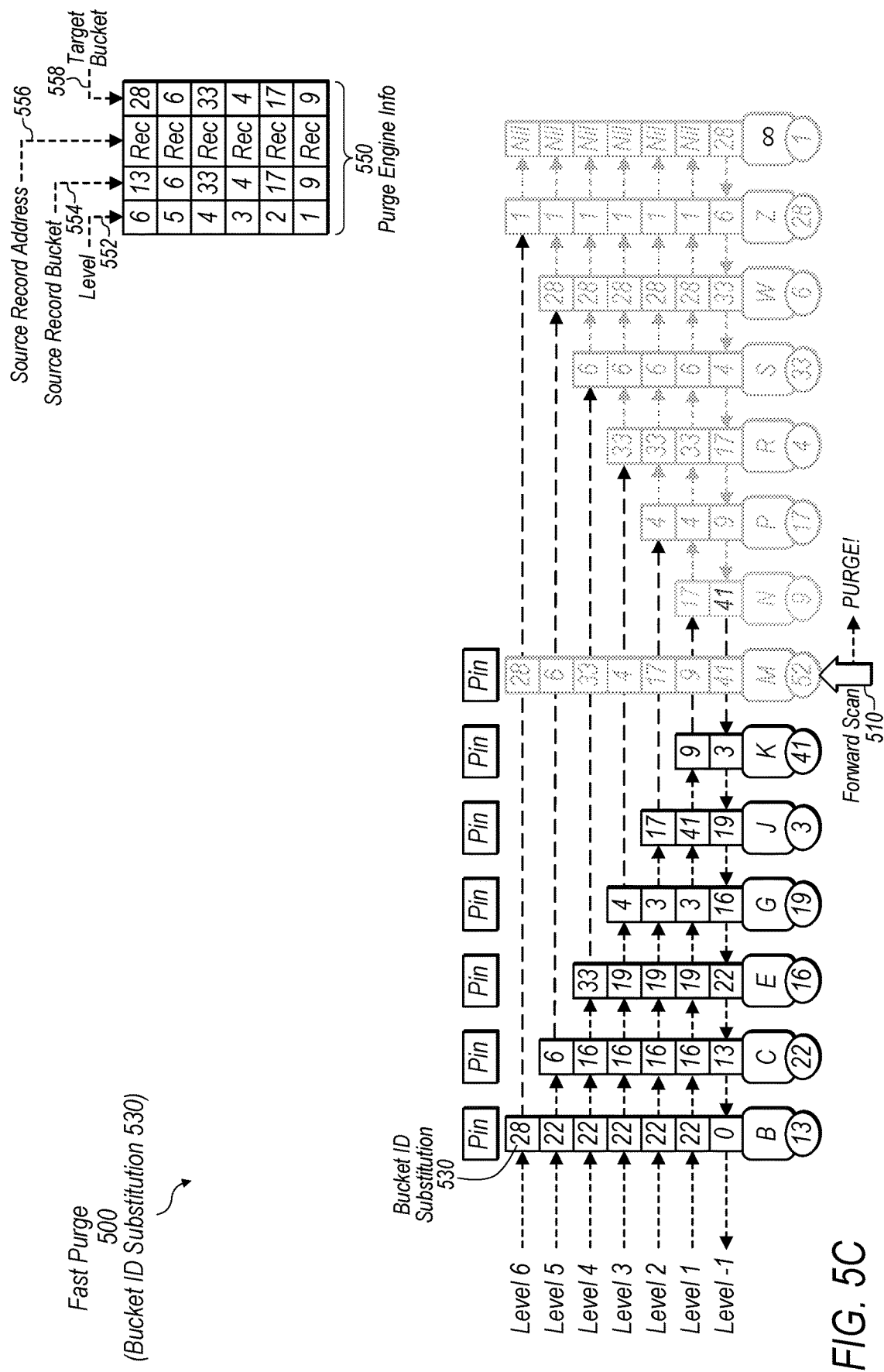

Turning now to FIG. 5C, a block diagram of bucket identifier substitution 530 of a fast purge 500 is depicted. In this example, purge engine 150 has now scanned the record M and determined from its purge flag 216 that this record 112 is to be purged. In order to do this, purge engine 150 updates pointers 218 in skip list 140 to account for the soon absence of record M.

Because purge engine 150 has already been tracking the unresolved pointers 512, purge engine 150 may know what pointers 218 potentially point into the record 112 being purged—and thus knows what pointers 218 may warrant updating. As shown in the example depicted in FIG. 5C, purge engine information 550 already identifies six unresolved pointers 218 at six different levels at the time record M is scanned. Because the record M has a tower 300 with height of six, purge engine 150 can assume that six pointers likely point into record M and determine this from target buckets 558 in information 550. Using this knowledge, purge engine 150 can perform a bucket ID substitution 530 in which purge engine 150 replaces the pointers 218 into record M with the pointers 218 included in record M. For example, as shown, the pointer 218 at level 6 in record B has been changed from bucket #55 to bucket #28, so that record B now points past record M. Similar changes are also made to the pointers 218 in records C-K at levels 1-5. If record M had a shorter tower 300 (e.g., of four levels), only a subset of these pointers 218 are updated (e.g., those in records E-K). In various embodiments, purge engine 150 also continues to pin the records 112 being updated and the record 112 being purged while these substitutions 530 are being performed. As shown, purge engine information 550 is also updated to reflect these changes as these updated pointers 218 may still point to records 112 scanned later that are flagged for purging. In the illustrated embodiment, the record N located in front of record M has its level −1 pointer 218 updated to point to record K. In such an embodiment, level −1 pointers may not be tracked using purge engine information 550 as they can easily be identified by traversing the level 1 pointer 218 in the record 112 being purged to identify the next record 112 in ascending key order with this backwards pointer 218.

As noted above, in some embodiments, transaction manager 104 is still permitted to insert records 112 into buffer data structure 106 while fast purge 500 is being performed as preventing insertions may have a significant impact on system performance. Because insertions have the potential to interfere with the purging of a record 112, however, purge engine 150 may perform a verification of purge engine information 550 prior to using it for any bucket ID substitutions 530 as will be discussed.

Figure 5D:
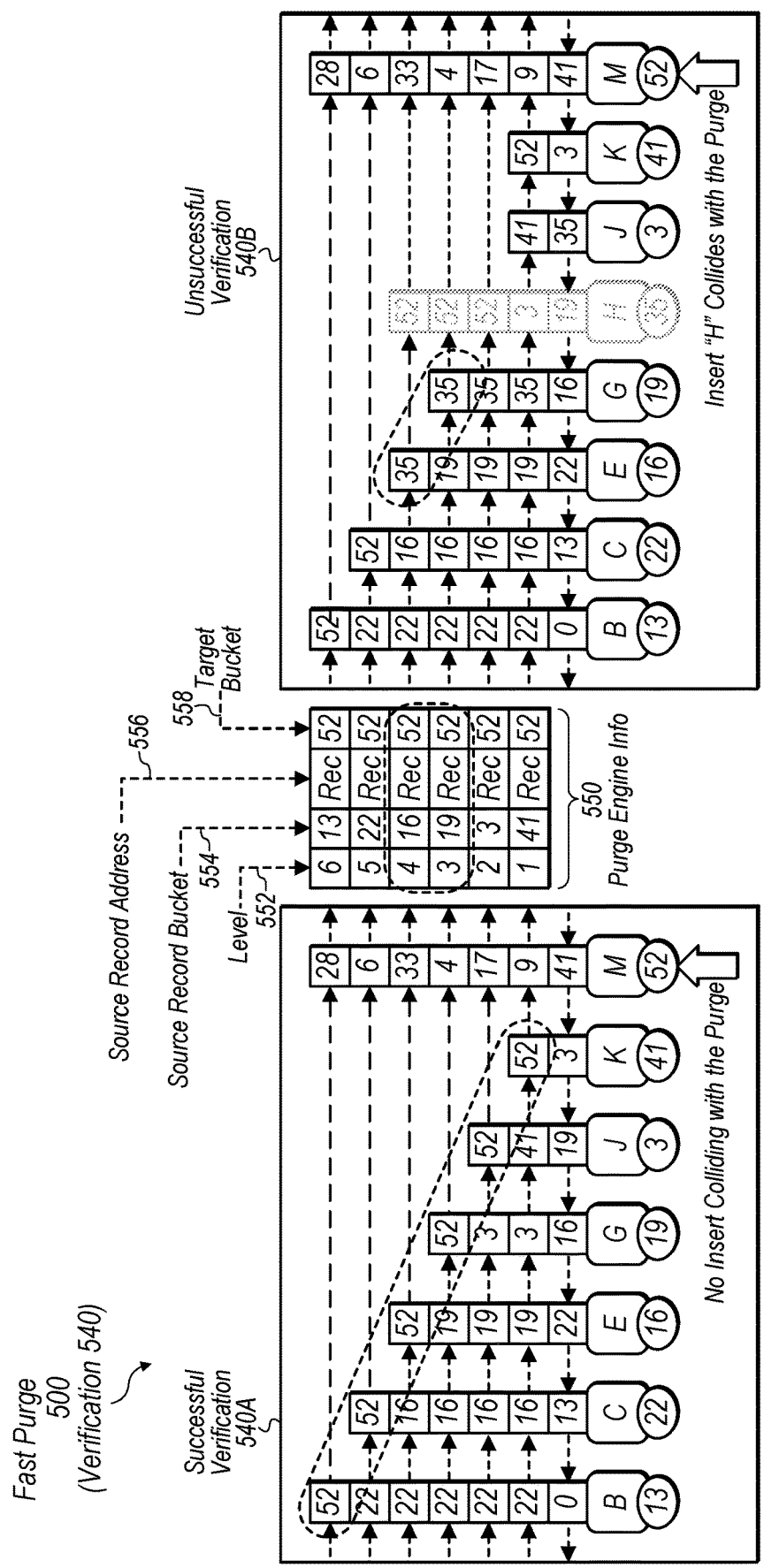

Turning now to FIG. 5D, a block diagram of a verification 540 of collected purge engine information 550 is depicted.

As purge engine information 550 may become stale if a new record 112 has been inserted, in various embodiments, purge engine 150 verifies that this information 550 has not become incorrect prior it being used in a substitution 530.

In various embodiments, purge engine 150 performs a verification 540 by using source record addresses 556 to access records 112. Purge engine 150 may then verify that pointers 218 at the levels 552 still point to same bucket IDs 312 that are identified by target buckets 558. If these pointers still match what is recorded in information 550 (as is the case in a successful verification 540A shown on the left in FIG. 5D), purge engine 150 may proceed to perform bucket ID substitutions 530 as just discussed.

In some instances, a mismatch may occur if a record 112 is inserted that has a tall enough tower 300 to obstruct a record 112 that previously pointed at a record 112 being purged. For example, in the unsuccessful verification 540B shown on the right of FIG. 5D, a record H is inserted with a tower height of four, which results in pointers at levels 2-4 in records E and G pointing to bucket #35, instead of bucket #52 where record M is located. Thus, when purge engine 150 goes to verify purge engine information 550, it is no longer consistent with what is actually in skip list 140. If this occurs, this is not a problem as purge engine 150, in some embodiments, delays purging of the record 112 until another subsequent scan 510 is performed. While record M may be allowed to persist for a little longer in this example, it eventually gets purged. If, however, record H included a shorter tower 300 (e.g., it had a height of one), its insertion would not interfere with purge engine information 550 as the level 1 pointer 218 in record K, which currently points to record M being purged, is not altered. Thus, purge engine 150 would successfully verify information 550 and proceed to perform bucket ID substitutions 530.

Because record chains 110 and/or records 112 may also have the potential to be modified during verifications 540 and substitutions 530, purge engine 150 may also handle acquiring latches 126 and/or locks 217 to prevent modifications during verifications 540 and substitutions 530. In some embodiments, this may include acquiring latches 126 and/or locks 217 associated with the record 112 being purged, the records 112 identified in purge engine information 550, and the record 112 coming after the record being purged in key order as it may include a backward pointer that may need to be updated. In such an embodiment, latches 126 and/or locks 217 may be acquired in response to identifying a record 112 to be purged and held throughout verification 540 and substitutions 530.

Figure 6:
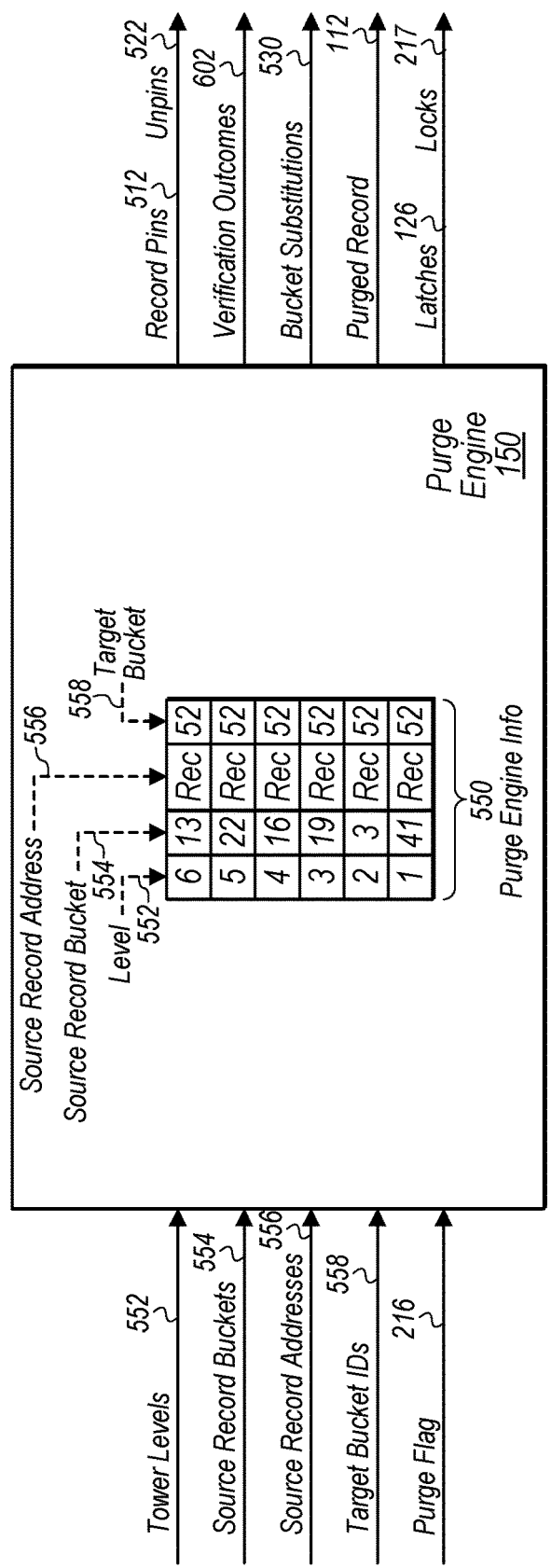
FIG. 6 is a block diagram illustrating one embodiment of a purge engine performing a purge of the skip list.

Turning now to FIG. 6, a block diagram of the inputs and outputs of purge engine 150 is depicted. In the illustrated embodiment, purge engine 150 receives tower levels 552, source records buckets 554, source record addresses 556, and target bucket IDs 558 from records 112 being scanned in forward scan 510. Purge engine 150 may then use this information to maintain and update purged engine information 550. Purge engine 150 may also receive purge flags 216, which again may be used to determine whether records 112 are to be purged. Based on this information, purge engine 150 may output instructions to pin 514 or unpin 522 records 112, outcomes 602 for verifications 540, bucket IDs 312 for bucket substitutions 530, purged records 112, and instructions to modify latches 126 and locks 217. In some embodiments, purge engine 150 may have more (or fewer) inputs and outputs.

Although purge engine 150 may perform a scan 510 of the entire skip list 140 sequentially, additional performance gains may be achieved, in some embodiments, by scanning multiple sections in parallel as will be discussed next.

Figure 7:
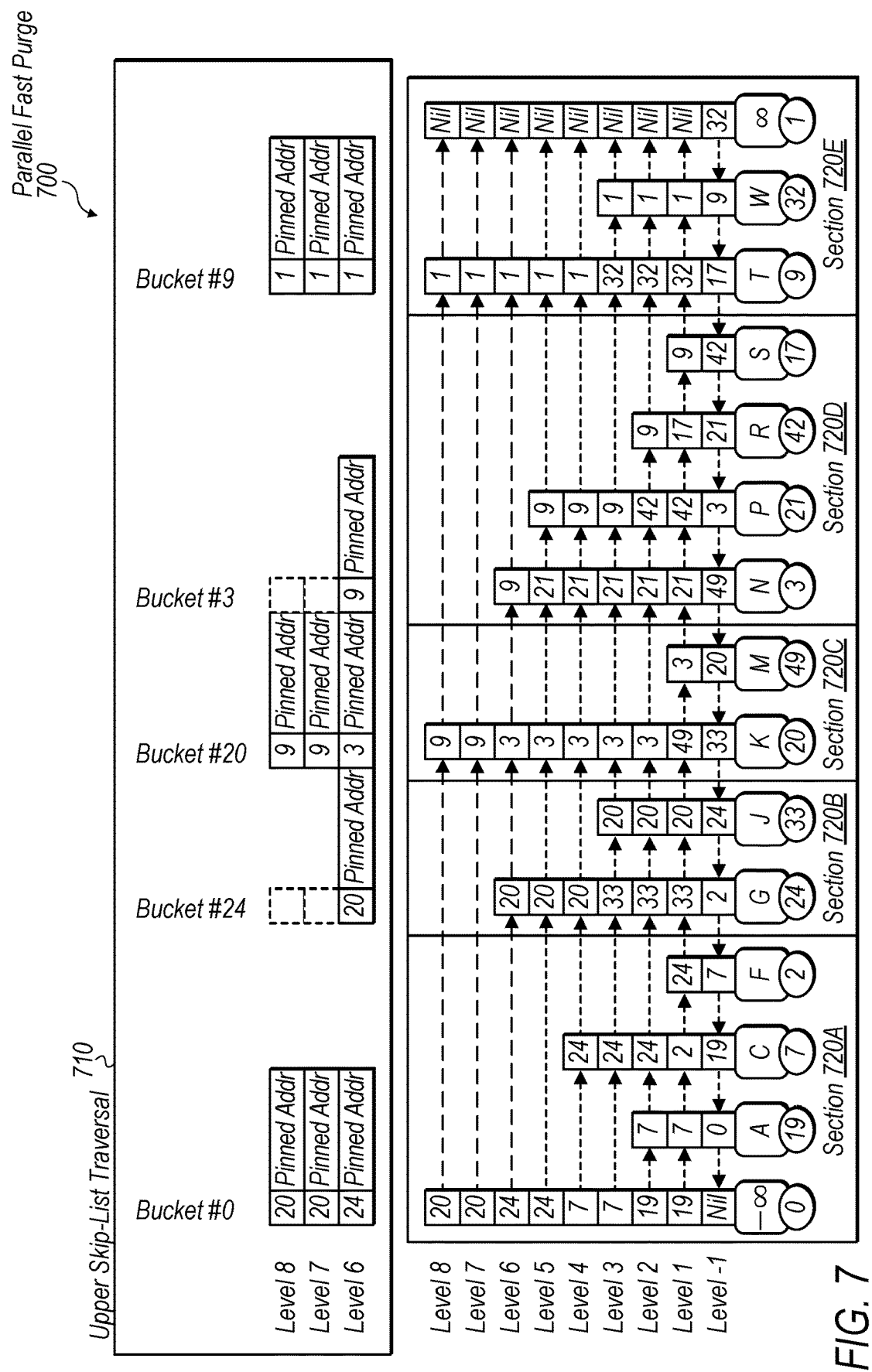
FIG. 7 is diagram illustrating one embodiment of a parallel fast purge process for purging records from the skip list.

Turning now to FIG. 7, a block diagram of a parallel fast purge 700 is depicted. As will be discussed, purge engine 150 may perform parallel fast purge 700 by dividing skip list 140 into sections 720, which get handled by separate threads executing in parallel.

In the illustrated embodiment, parallel fast purge 700 begins with purge engine 150 determining how to divide skip list 140 by performing a traversal 710 of a top portion of skip list 140 in order to identify the records 112 that have the tallest towers 300 in skip list 140. An advantage of identifying these records 112 is that they can be used as the left most boundary of each section 720, which can be helpful as they ensure most unresolved pointers 512 are local to a given section 720 as they likely include the local maximum tower height for that section 720—assuming that there is not a record 112 inserted in the interim that has an even taller tower 300. For example, in FIG. 7, the tallest towers 300 reside in the left sentinel tower and the records 112 pointed to by buckets 124 with bucket IDs 20, 9, 24, and 3. When purge engine 150 walks down the top portion, purge engine 150 may be targeting creating a particular number of sections 720, which may affect how far down engine 150. In the example depicted in FIG. 7, purge engine 150 may be targeting creation five sections 720 and thus may continue walking down skip list 140 until it has identified that many unique bucket identifiers 312. Thus, in the depicted example, purge engine 150 walks down levels 8-6 before it is able to identify five unique bucket identifiers 312, which are then used create five sections 720.

Once sections 720 have been determined, in some embodiments, purge engine 150 instantiates a thread pool having multiple threads and begins assigning sections 720 to the threads for scanning. Each executing thread may then use the fast purge 500 discussed above to scan its assigned section 720 (including maintain its own copy of purge engine information 550 for unresolved pointers 512 its assigned section 720) and purge flagged records 112. If there are fewer threads in the thread pool than sections 720, threads may circle back to receive another assigned section 720 from purge engine 150 once they have completed work on a previously assigned section 720.

As threads scan their assigned sections 720, they may determine that the initial records 112 at the left boundaries of sections 720 have been flagged for purging. In some embodiments, these threads may make a note that these records 112 are ready for purging but hold off on purging them until after sections 720 have been scanned. At that point, purge engine 150 may perform a slow purge 400 for just those flagged record 112—thus, purge engine 150 is traversing down the skip list 140 for only a small number of records 112, not every record 112 being purged.

Various methods that use one or more of the techniques discussed above will now be discussed.

Figure 8A:
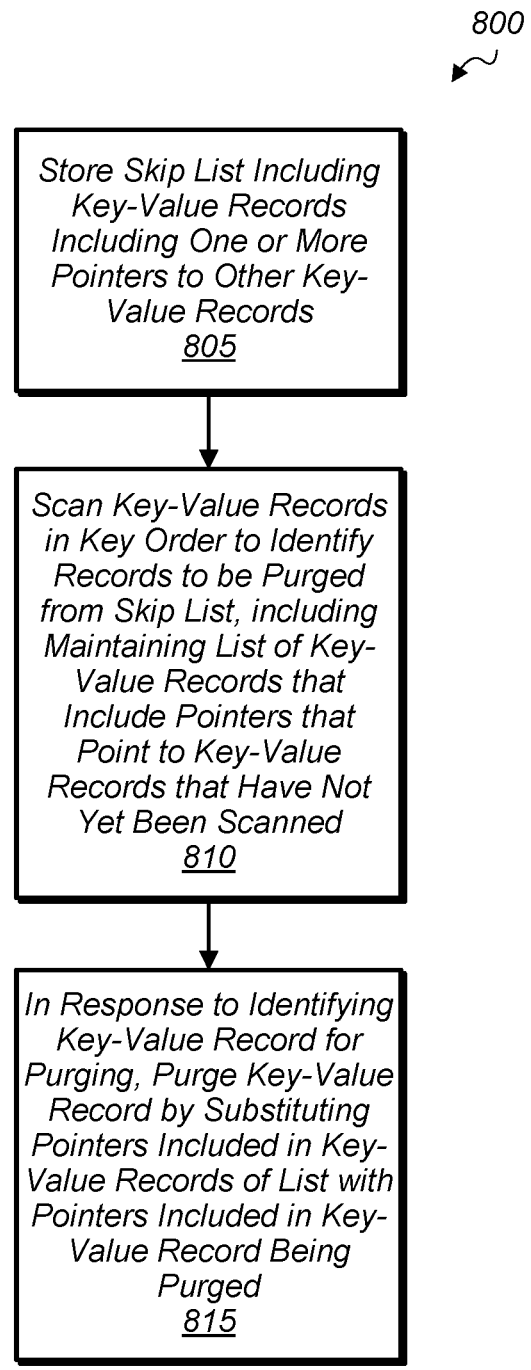
FIGS. 8A-8C are flow diagrams illustrating embodiments of methods related to purging records from a skip list.

Turning now to FIG. 8A, a flowchart of a method 800 for fast purging skip list records is depicted. Method 800 is one embodiment of a method performed by a computing system, such as database system 10, which may be executing purge engine 150. In some instances, performance of method 800 may reduce the burden of purging records from a skip list.

In step 805, a skip list (e.g., skip list 140) is stored including a plurality of key-value records (e.g., key-value records 112) that include one or more pointers (e.g., skip list pointers 218) to others of the plurality of key-value records. In some embodiments, a key-value record is inserted into the skip list in response to a request to perform a database transaction (e.g., a database transaction 102) associated with the key-value record. In response to the database transaction committing and the key-value record being stored in a persistent storage (e.g., an LSM tree of database 108), a flag (e.g., purge flag 216) is set in the key-value record to indicate that the key-value record is authorized to be purged. In some embodiments, a first of the plurality of key-value records in the skip list points to a second of the plurality of key-value records in the skip list by including a first pointer (e.g., indirect pointer 312) that points to a bucket (e.g., bucket 124) in a hash table (e.g., hash table 120), where the bucket includes a second pointer (e.g., direct pointer 202) to the second key-value record.

In step 810, the plurality of key-value records is scanned in key order to identify key-value records to be purged from the skip list. In various embodiments, the scanning includes maintaining a list (e.g., purge engine information 550) of key-value records that include pointers (e.g., unresolved pointers 512) that point to key-value records that have not yet been scanned by the scanning. In some embodiments, the scanning includes determining that a pointer (e.g., a resolved pointer 516) of a first key-value record included in the list points to a second key-value record that has now been scanned. In response to the determining, the first key-value record in the list is replaced (e.g., via an information update 520) with the second key-value record. Relocation of the second key-value record is prevented (e.g., via a pin 514) within memory while the second key-value is included in the list. In some embodiments, one or more key-value records are inserted into the skip list while the scanning is being performed. In some embodiments, the scanning includes identifying the key-value record for purging based on the set flag.

In step 815, in response to identifying a key-value record for purging, the key-value record is purged by substituting (e.g., bucket ID substitutions 530) the pointers included in the key-value records of the list with pointers included in the key-value record being purged. In some embodiments, in response to identifying the key-value record for purging, a verification (e.g., verification 540) of the list of key-value records is performed including determining whether the pointers included in the key-value records of the list point to the key-value record for purging. In some embodiments, in response to determining that the inserting has caused one or more pointers included in the key-value records of the list to not point to the key-value record for purging, the purging of the key-value record is delayed until a subsequent scanning is performed. In some embodiments, latches (e.g., latches 126 and/or locks 217) are acquired to prevent modification of the key-value records by processes other than a process performing the scanning. Acquisition of the latches is maintained until after the substituting of the pointers included the key-value records of the list with pointers included in the key-value record being purged.

In some embodiments, method 800 further includes, prior to the scanning of the plurality of key-value records in key order, walking down (e.g., via an upper skip-list traversal 710) the skip list to identify a subset of the plurality of key-value records. Based on the key-value records in the identified subset, the skip list is divided into sections (e.g., sections 720). The sections are assigned to a plurality of threads executable to scan the sections in parallel. In some embodiments, one of the plurality of threads receives an assigned section for scanning and scans the assigned section, including maintaining, for the assigned section, a list of key-value records with unresolved pointers. In response to identifying a key-value record for purging in the assigned section, the thread uses the list of key-value records for the assigned section to purge the key-value record in the assigned section.

Figure 8B:
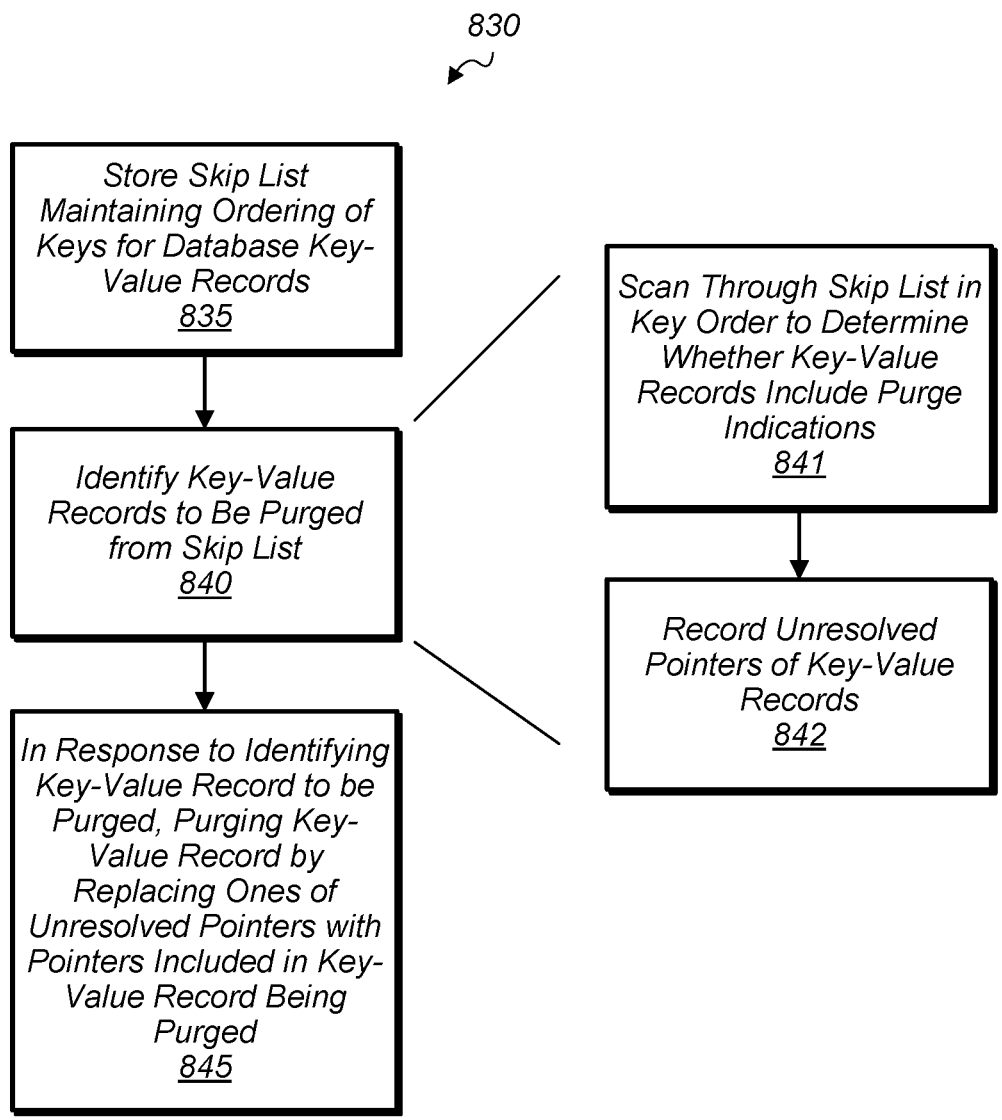

Turning now to FIG. 8B, a flowchart of a method 830 for fast purging skip list records is depicted. Method 830 is another embodiment of a method performed by a computing system, such as database system 10, which may be executing purge engine 150. In some instances, performance of method 830 may reduce the burden of purging records from a skip list.

In step 835, the computing system stores a skip list (e.g., skip list 140) that maintains an ordering of keys (e.g., keys 212) for key-value records (e.g., key-value records 112) of a database (e.g., database 108). In some embodiments, the skip list maintains the ordering of keys for key-value records of database transactions awaiting commitment by the database.

In step 840, the computing system identifies key-value records to be purged from the skip list. In the illustrated embodiment, step 840 includes, in sub-step, 841 scanning through the skip list in key order to determine whether ones of the key-value records include an indication (e.g. a purge flag 216) that purging is permitted. In some embodiments, prior to the scanning, the computing system traverses a top portion (e.g., via an upper skip-list traversal 710) of the skip list to determine divisions (e.g., sections 720) of the skip list for parallel scanning. The computing system assigns the divisions to a plurality of threads executable to scan the divisions in parallel with one another. In the illustrated embodiment, step 840 further includes recording unresolved pointers (e.g., unresolved pointers 512) of key-value records in the skip list, the unresolved pointers pointing to ones of the key-value records that have yet to be scanned by the scanning.

In step 845, in response to identifying a key-value record to be purged, the computing system purges the key-value record by replacing (e.g., via bucket ID substitutions 530) ones of the unresolved pointers with pointers included in the key-value record being purged. In some embodiments, during the scanning, the computing system inserts one or more key-value records into the skip list. In response to identifying the key-value record to be purged, the computing system verifies (e.g., a verification 540) that the ones of the unresolved pointers still point to the key-value record to be purged after inserting the one or more key-value records. In some embodiments, in response to determining that, at least, one of the unresolved pointers no longer points to the key-value record to be purged, the computing system delays the purging of the key-value record until a subsequent scanning of the skip list is performed.

Figure 8C:
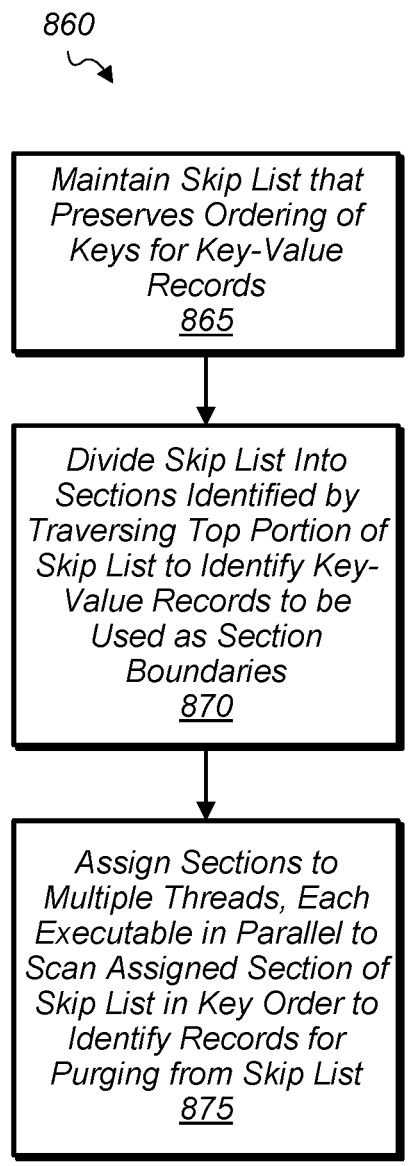

Turning now to FIG. 8C, a flowchart of a method 860 for fast purging records in parallel is depicted. Method 860 is another embodiment of a method performed by a computing system, such as database system 10, which may be executing purge engine 150. In some instances, performance of method 860 may reduce the time taken to identify and purge records from a skip list.

In step 865, a skip list (e.g., skip list 140) is maintained that preserves an ordering of keys (e.g., keys 212) for a plurality of key-value records (e.g., records 112). In various embodiments, key-value records are inserted into the skip list as database transactions (e.g., database transactions 102) corresponding to the inserted key-value records await commitment. In response to a database transaction corresponding to one of the inserted key-value records committing, a flag (e.g. purge flag 216) is set in the inserted key-value record to indicate that the inserted key-value record is permitted to be purged from the skip list. In some embodiments, a first of the plurality of key-value records in the skip list indirectly points to a second of the plurality of key-value records by including a first pointer (e.g., an indirect pointer 312) to a bucket (e.g., bucket 124) in a hash table (e.g., hash table 120), and the bucket includes a second pointer (e.g., direct pointer 202) to the second key-value record.

In step 870, the skip list is divided into sections (e.g., sections 720) identified by traversing a top portion (e.g., via upper skip-list traversal 710) of the skip list to identify ones of the key-value records to be used as boundaries of the sections (e.g., record 112 with key G in section 720B in FIG. 7).

In step 875, the sections are assigned to a plurality of threads, each being executable in parallel to scan an assigned section of the skip list in key order to identify key-value records for purging from the skip list. In some embodiments, a first of the plurality of threads maintains a list (e.g., purge engine information 550) of unresolved pointers (e.g., unresolved pointers 512) for the section assigned to the first thread, the unresolved pointers being pointers included in key-value records scanned by the first thread that point to key-value records that have not yet been scanned by the first thread. In response to identifying a key-value record in the assigned section for purging, the first thread replaces (e.g., via bucket ID substitutions 530) ones of the unresolved pointers with pointers included in the key-value record to be purged.

In some embodiments, method 860 further includes, subsequent to the assigned sections being scanned by the plurality of threads, accessing the key-value records used as boundaries of the sections to identify ones of the boundary key-value records purging. In response to identifying a boundary key-value record for purging, the skip list is traversed down to identify key-value records to be updated in response to the boundary key-value record being purged.

Exemplary Computer System

Figure 9:
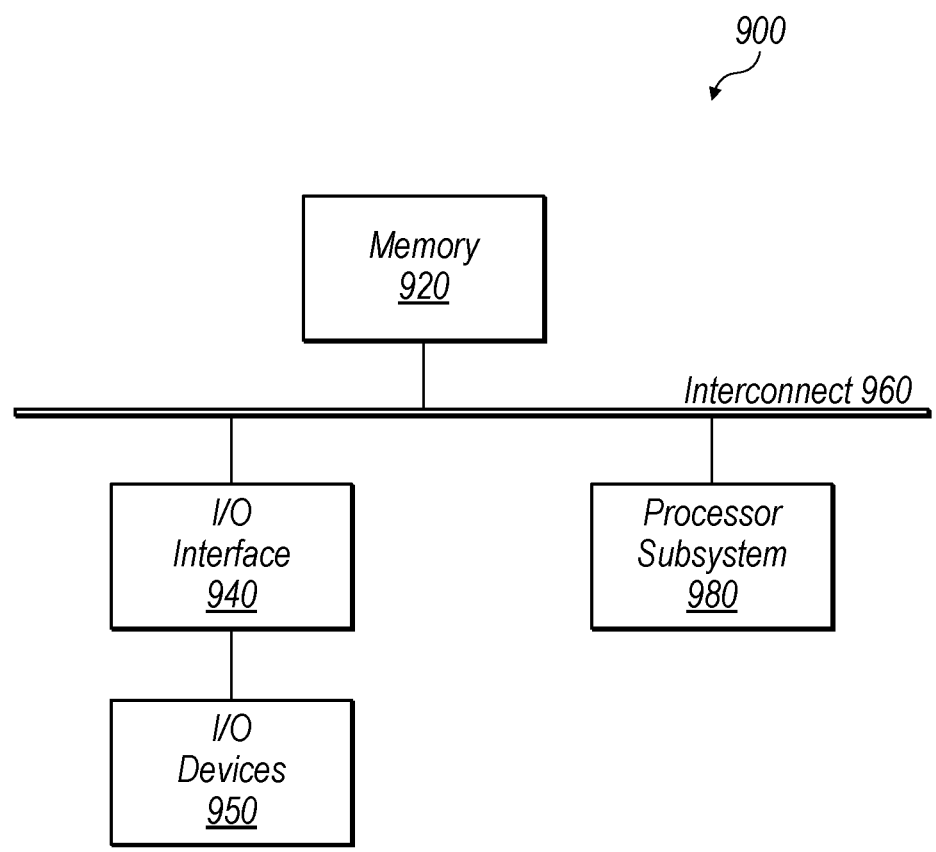
FIG. 9 is a block diagram illustrating one embodiment of an exemplary computer system.

Turning now to FIG. 9, a block diagram of an exemplary computer system 900, which may implement functionality described herein, such as database system 10, a portion of database system 10, or a client interacting with database system 10, is depicted. Computer system 900 includes a processor subsystem 980 that is coupled to a system memory 920 and I/O interface(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 900 is shown in FIG. 9 for convenience, system 900 may also be implemented as two or more computer systems operating together in a cluster.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980 to cause system 900 to perform operations described herein. In some embodiments, memory 920 may include transaction manager 104, purge engine 150, buffer data structure 106, and/or portions of database 108.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A non-transitory computer readable medium having program instructions stored thereon that are capable of causing a computing system to implement operations comprising:
   storing a skip list including a plurality of key-value records that include one or more pointers to others of the plurality of key-value records;
   scanning the plurality of key-value records in key order to identify key-value records to be purged from the skip list, wherein the scanning includes:
      maintaining a list of key-value records that include pointers that point to key-value records that have not yet been scanned by the scanning; and
      in response to identifying a key-value record for purging, purging the key-value record by substituting the pointers included in the key-value records of the list with pointers included in the key-value record being purged.

2. The computer readable medium of claim 1, wherein the operations further comprise:
   inserting the key-value record into the skip list in response to a request to perform a database transaction associated with the key-value record; and
   in response to the database transaction committing and the key-value record being stored in a persistent storage of a database, setting a flag in the key-value record to indicate that the key-value record is authorized to be purged; and
   wherein the scanning includes identifying the key-value record for purging based on the set flag.

3. The computer readable medium of claim 1, wherein the scanning includes:
   determining that a pointer of a first key-value record included in the list points to a second key-value record that has now been scanned;
   in response to the determining:
      replacing the first key-value record in the list with the second key-value record; and
      preventing relocation of the second key-value record within memory while the second key-value is included in the list.

4. The computer readable medium of claim 1, wherein the operations further comprise:
   inserting one or more key-value records into the skip list while the scanning is being performed.

5. The computer readable medium of claim 4, wherein the operations further comprise:
   in response to identifying the key-value record for purging, performing a verification of the list of key-value records, wherein the verification includes:
      determining whether the pointers included in the key-value records of the list point to the key-value record for purging.

6. The computer readable medium of claim 5, wherein the operations further comprise:
   in response to determining that the inserting has caused one or more pointers included in the key-value records of the list to not point to the key-value record for purging, delaying the purging of the key-value record until a subsequent scanning is performed.

7. The computer readable medium of claim 5, wherein the verification includes:
   acquiring latches to prevent modification of the key-value records by processes other than a process performing the scanning; and
   maintaining acquisition of the latches until after the substituting of the pointers included the key-value records of the list with pointers included in the key-value record being purged.

8. The computer readable medium of claim 1, wherein the operations further comprise:
   prior to the scanning of the plurality of key-value records in key order:
      walking down the skip list to identify a subset of the plurality of key-value records;
      based on the key-value records in the identified subset, dividing the skip list into sections; and
      assigning the sections to a plurality of threads executable to scan the sections in parallel.

9. The computer readable medium of claim 8, wherein the operations further comprise:
   receiving, by one of the plurality of threads, an assigned section for scanning;
   scanning, by the thread, the assigned section, wherein scanning the assigned section includes maintaining, for the assigned section, a list of key-value records with unresolved pointers; and in response to identifying a key-value record for purging in the assigned section, the thread uses the list of key-value records for the assigned section to purge the key-value record in the assigned section.

10. The computer readable medium of claim 1, wherein a first of the plurality of key-value records in the skip list points to a second of the plurality of key-value records in the skip list by including a first pointer that points to a bucket in a hash table, wherein the bucket includes a second pointer to the second key-value record.

11. A method, comprising:
storing, by a computing system, a skip list that maintains an ordering of keys for key-value records of a database;
identifying, by the computing system, key-value records to be purged from the skip list, including:
scanning through the skip list in key order to determine whether ones of the key-value records include an indication that purging is permitted;
recording unresolved pointers of key-value records in the skip list, wherein the unresolved pointers point to ones of the key-value records that have yet to be scanned by the scanning; and
in response to identifying a key-value record to be purged, the computing system purging the key-value record by replacing ones of the unresolved pointers with pointers included in the key-value record being purged.

12. The method of claim 11, further comprising:
prior to the scanning, the computing system traversing a top portion of the skip list to determine divisions of the skip list for parallel scanning; and
assigning, by the computing system, the divisions to a plurality of threads executable to scan the divisions in parallel with one another.

13. The method of claim 11, further comprising:
during the scanning, the computing system inserting one or more key-value records into the skip list; and
in response to identifying the key-value record to be purged, the computing system verifying that the ones of the unresolved pointers still point to the key-value record to be purged after inserting the one or more key-value records.

14. The method of claim 13, further comprising:
in response to determining that, at least, one of the unresolved pointers no longer points to the key-value record to be purged, delaying the purging of the key-value record until a subsequent scanning of the skip list is performed.

15. The method of claim 11, wherein the skip list maintains the ordering of keys for key-value records of database transactions awaiting commitment by the database.

16. A non-transitory computer readable medium having program instructions stored thereon that are capable of causing a computing system to implement operations comprising:

maintaining a skip list that preserves an ordering of keys for a plurality of key-value records;
dividing the skip list into sections, wherein the sections are identified by traversing a top portion of the skip list to identify ones of the key-value records to be used as boundaries of the sections; and
assigning the sections to a plurality of threads, each being executable in parallel to scan an assigned section of the skip list in key order to identify key-value records for purging from the skip list.

17. The computer readable medium of claim 16, wherein the operations further comprise:
maintaining, by a first of the plurality of threads, a list of unresolved pointers for the section assigned to the first thread, wherein the unresolved pointers are pointers included in key-value records scanned by the first thread that point to key-value records that have not yet been scanned by the first thread; and
in response to identifying a key-value record in the assigned section for purging, the first thread replacing ones of the unresolved pointers with pointers included in the key-value record to be purged.

18. The computer readable medium of claim 17, wherein the operations further comprise:
subsequent to the assigned sections being scanned by the plurality of threads:
accessing the key-value records used as boundaries of the sections to identify ones of the boundary key-value records for purging; and
in response to identifying a boundary key-value record for purging, traversing down the skip list to identify key-value records to be updated in response to the boundary key-value record being purged.

19. The computer readable medium of claim 16, wherein the operations further comprising:
inserting key-value records into the skip list as database transactions corresponding to the inserted key-value records await commitment; and
in response to a database transaction corresponding to one of the inserted key-value records committing, setting a flag in the inserted key-value record to indicate that the inserted key-value record is permitted to be purged from the skip list.

20. The computer readable medium of claim 16, wherein a first of the plurality of key-value records in the skip list indirectly points to a second of the plurality of key-value records by including a first pointer to a bucket in a hash table, wherein the bucket includes a second pointer to the second key-value record.

* * * * *